US007802667B2

(12) United States Patent
Raszkowski et al.

(10) Patent No.: US 7,802,667 B2
(45) Date of Patent: Sep. 28, 2010

(54) CLUTCH EXHAUST ASSEMBLY AND METHOD

(75) Inventors: James A. Raszkowski, Indianapolis, IN (US); Michael D. Foster, Carmel, IN (US); Kevin C. Beckner, Indianapolis, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 449 days.

(21) Appl. No.: 11/685,963

(22) Filed: Mar. 14, 2007

(65) Prior Publication Data

US 2008/0223685 A1 Sep. 18, 2008

(51) Int. Cl.
*F16D 25/12* (2006.01)
*F16D 25/0638* (2006.01)

(52) U.S. Cl. ..................... 192/106 F; 92/80; 192/85.25

(58) Field of Classification Search ............. 192/106 F, 192/85.25, 85.27; 92/80
See application file for complete search history.

(56) References Cited

U.S. PATENT DOCUMENTS 5,106,348 A * 4/1992 Koivunen ................... 475/126
5,887,690 A * 3/1999 Haupt ..................... 192/87.11
6,464,059 B1 * 10/2002 Kundermann et al. .... 192/87.11
7,001,298 B2 * 2/2006 Biermann et al. ........... 475/116
2005/0205380 A1 * 9/2005 Raszkowski ............. 192/106 F

FOREIGN PATENT DOCUMENTS

CN 1846080 A 10/2006
CN 101410647 A 4/2009
DE 102006014737 A1 10/2007

* cited by examiner

*Primary Examiner*—David D Le
*Assistant Examiner*—Ryan Dodd
(74) *Attorney, Agent, or Firm*—Quinn Law Group, PLLC

(57) ABSTRACT

An assembly and method is provided for reducing clutch wear due to centrifugal apply pressure within a clutch-apply cavity. The assembly comprises a rotatable clutch housing, a clutch-apply piston disposed within a clutch-apply cavity, and a balance piston. The balance and apply pistons define a balance cavity including a liquid fill channel and a dedicated air exhaust channel having a control radius configured to at least partially offset or compensate for the centrifugal apply force generated within the clutch-apply cavity when the clutch assembly rotates. The method includes configuring the balance cavity with an exhaust channel for exhausting fluid, and providing the exhaust channel with a control radius determined by the innermost radius of rotating fluid within the balance cavity as measured with respect to the centerline of rotation of the clutch assembly, the control radius being suitable for exhausting any excess of centrifugal balance force over centrifugal apply force.

12 Claims, 2 Drawing Sheets

CLUTCH EXHAUST ASSEMBLY AND METHOD

TECHNICAL FIELD

The present invention relates to an improved rotatable clutch assembly having at least one dedicated balance cavity exhaust port configured to optimize clutch performance during rapid acceleration and periods of high clutch rotational speed.

BACKGROUND OF THE INVENTION

In a vehicle having an automatic transmission, a clutch assembly engages or couples a rotating shaft such as an engine crankshaft with a stationary shaft such as a driveshaft in order to transmit power from the engine to the drive wheels. Likewise, the clutch assembly disengages the respective shafts to interrupt the power transfer and permit smooth shifting between, for example, the various gears of a planetary gear set. Hydraulic clutch assemblies or hydraulic clutches in particular are hydraulically-actuated torque-transmitting devices typically having a series of friction elements arranged in a clutch pack within a clutch housing. The clutch pack is actuated by a clutch-apply piston disposed within a clutch-apply cavity portion of the housing, the piston being powered or energized by a supply of non-compressible hydraulic fluid. When hydraulic clutch pressure is reduced, the clutch is released or disengaged, and when clutch pressure is increased, the clutch is actuated or engaged.

In a rotating clutch assembly, a clutch housing having a clutch-apply cavity rotates along with one of the two rotating members or shafts, while a clutch return spring helps bias the clutch-apply piston. When the clutch assembly is not engaged, clutch-apply response time may be improved by maintaining a relatively low fluid pressure within the apply cavity. However, when the clutch reaches a relatively high rotational speed, the centrifugal force imparted by the rotation of the clutch housing may induce a substantial pressure head or centrifugal apply force within the clutch-apply cavity. If the centrifugal apply force exceeds the return spring force provided by the biasing spring, inadvertent or premature application of the clutch may result.

The centrifugal apply force may be compensated for by positioning a separate balance cavity opposite the clutch-apply cavity within the clutch housing. The rotation of the clutch assembly fills the balance cavity with fluid, which can then partially drain from the balance cavity when the rotation ceases. When the balance cavity is full of fluid and the clutch assembly is rotating, the rotating fluid within the balance cavity will act to produce a centrifugal balance force or pressure that opposes or counteracts the centrifugal apply force, helping to at least partially offset or negate the apply force created by the pressure head within the clutch-apply cavity. However, when the clutch-apply cavity is attached to a rotating transmission component capable of relatively rapid acceleration and high rotational speed, such as a driveshaft connected to an electric motor within a hybrid vehicle transmission, relatively rapid fluid fill of the balance cavity is essential in order to provide a balancing opposing pressure to the rapidly increasing apply cavity pressure, and avoid premature application and therefore wear or burnout of the hydraulic clutch.

SUMMARY OF THE INVENTION

Accordingly, an improved clutch assembly is provided for use within an automotive transmission, the assembly comprising a main cavity and a balance cavity having at least one air exhaust channel and at least one fluid fill channel, wherein the air exhaust channel is configured to rapidly exhaust air from the balance cavity when fluid enters the balance cavity through the fluid fill channel.

In one aspect of the invention, the air exhaust channel has a control radius configured to substantially offset the centrifugal apply force imparted by the rotation of the clutch apparatus.

In another aspect of the invention, a vehicle transmission has a rotatable hydraulic clutch, a balance piston, and a clutch-apply piston, wherein the balance piston and clutch-apply pistons at least partially define a balance cavity having a pair of fluid channels configured to rapidly fill the balance cavity with non-pressurized fluid during rotation of the clutch assembly.

In another aspect of the invention, a method is provided for reducing clutch wear in a rotatable clutch assembly having a clutch-apply cavity and balance cavity, the method including configuring the balance cavity with an exhaust channel for exhausting fluid from the balance cavity and providing the exhaust channel with a control radius determined by the innermost radius of rotating fluid in the balance cavity with respect to the centerline of rotation of the assembly, the control radius being suitable for exhausting any excess of centrifugal balance force over centrifugal apply force.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
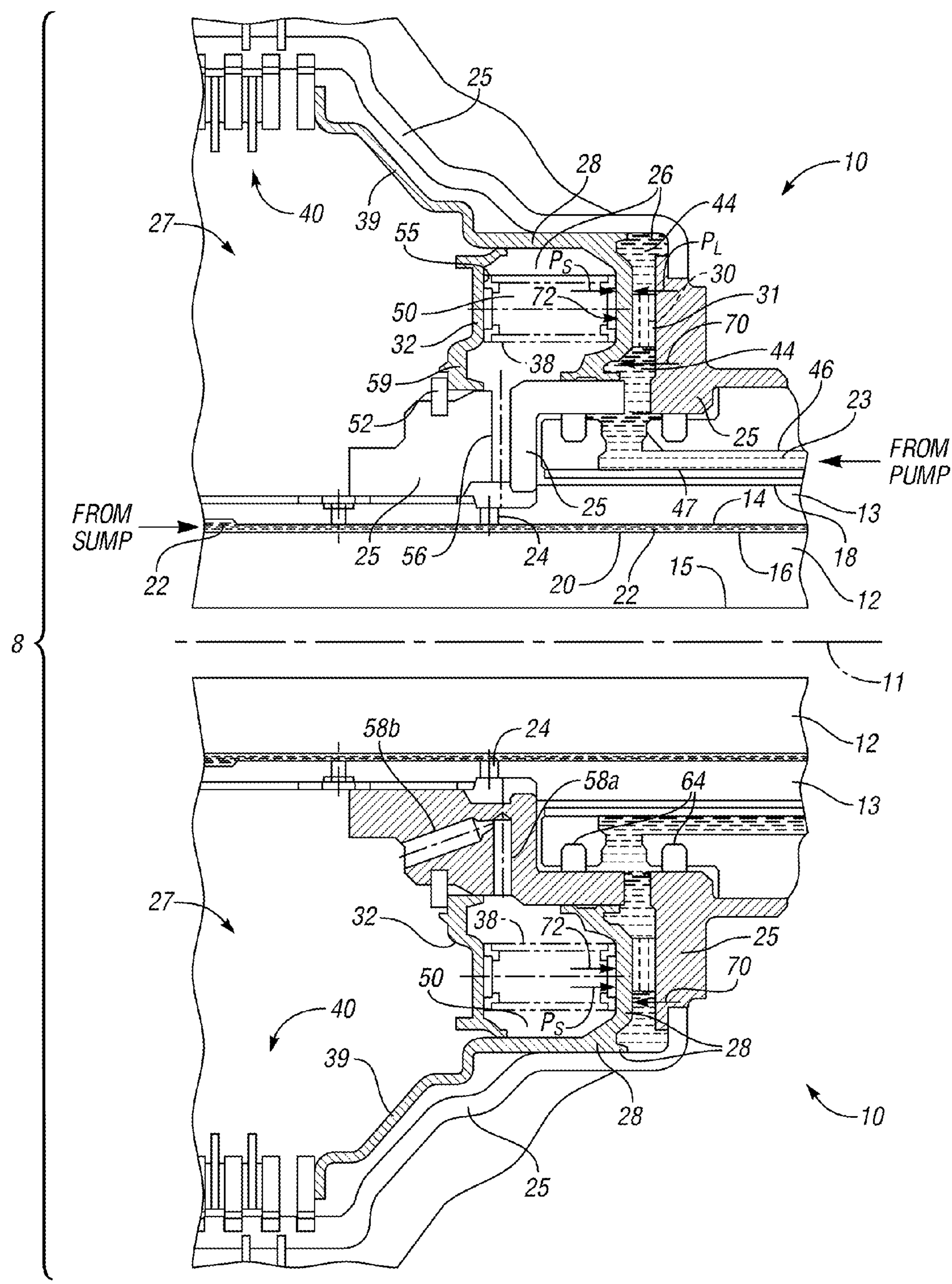
FIG. 1 schematically represents a cross-sectional view of a rotating hydraulic clutch according to the invention, wherein the lower half of the figure is cut along a different plane from that of the top half.

Referring to the drawings wherein like reference numbers correspond to like or similar components throughout the several figures, there is shown in FIG. 1 a cross-sectional view of a transmission 8 having a rotatable clutch assembly 10 mounted with respect to a pair of rotatable components such as co-axial inner and outer shafts 12, 13, respectively, which are rotatable around or with respect to a centerline 11. Centerline 11 divides FIG. 1 into upper and lower halves showing staggered cross-sectional views taken along different planes to more clearly depict the internal detail of clutch assembly 10. Rotatable shafts 12, 13 have respective internal diameters or surfaces 15, 14, and respective outer diameters or surfaces 16, 18, with a cylindrical channel or volume 20 defined between shaft surfaces 14, 16. Volume 20 is in fluid communication with a non-pressurized source of fluid 22, such as a transmission reservoir or sump (not shown). The fluid 22, such as transmission fluid, oil, or other fluid suitable for use as a coolant and/or lubricant with a rotating hydraulic clutch, fills volume 20, which is also in fluid communication with a preferably cylindrical fluid fill port 24 that is drilled, tapped, or otherwise formed in outer shaft 13. While a representative co-axial two-shaft configuration is shown in FIG. 1, those skilled in the art will recognize that the number and style of rotating shafts used may be varied within the terms of this invention.

Clutch assembly 10 may be cast or formed in one piece or welded to form a generally bell-shaped configuration or clutch housing 25 at least partially defining a primary housing cavity 26 and a secondary cavity 27. Primary cavity 26 is suitably sized and configured for containing a clutch-apply piston 28, a clutch piston stop 31, a return spring 38, and a balance piston 32. Secondary cavity 27 encompasses the remainder of the clutch housing including the clutch pack 40, as shown in FIG. 1. Within the primary cavity 26, clutch-apply piston 28 preferably includes an extension or arm portion 39, with arm portion 39 being configured in a bell or cup-shape to engage a clutch pack 40 when clutch-apply piston 28 is actuated or otherwise engaged. Balance piston 32 has a main surface 55 configured to oppose return spring 38. Clutch-apply piston 28 and balance piston 32 at least partially define a balance cavity 50 therebetween within primary cavity 26. Likewise, clutch-apply piston 28 and clutch housing 25 at least partially define a clutch-apply cavity 44 therebetween within primary cavity 26. Clutch-apply cavity 44 is in fluid communication with a fluid channel 46 containing a supply of pressurized fluid 23 at a line pressure, for example from a controllable source of pressure such as a pump (not shown), with a plurality of dynamic fluid seals 64 flanking fluid port 47.

Within balance cavity 50, the balance piston 32 is held substantially fixed or stationary relative to the sliding or moveable clutch-apply piston 28 on one side by clutch return spring 38 disposed between the pistons 32, 28 within balance cavity 50, and on the other side by a balance piston stop 52. Clutch return spring 38 is configured to bias the clutch-apply piston 28 upon disengagement of clutch assembly 10. Within clutch-apply cavity 44, clutch-apply piston 28 is operatively attached to clutch piston stop 31, with clutch piston stop 31 containing a plurality of channels or thru-ports 30 configured to allow pressurized fluid 23 to freely flow through the clutch piston stop 31 within the clutch-apply cavity 44. Pressurized fluid 23 enters the clutch-apply cavity 44 through a fluid port 47, which is in fluid communication through fluid channel 46 with a source of pressurized hydraulic fluid, for example a pump, operable to provide fluid at a low line pressure $P_L$ of preferably approximately 2-3 psi (gauge).

Figure 2:
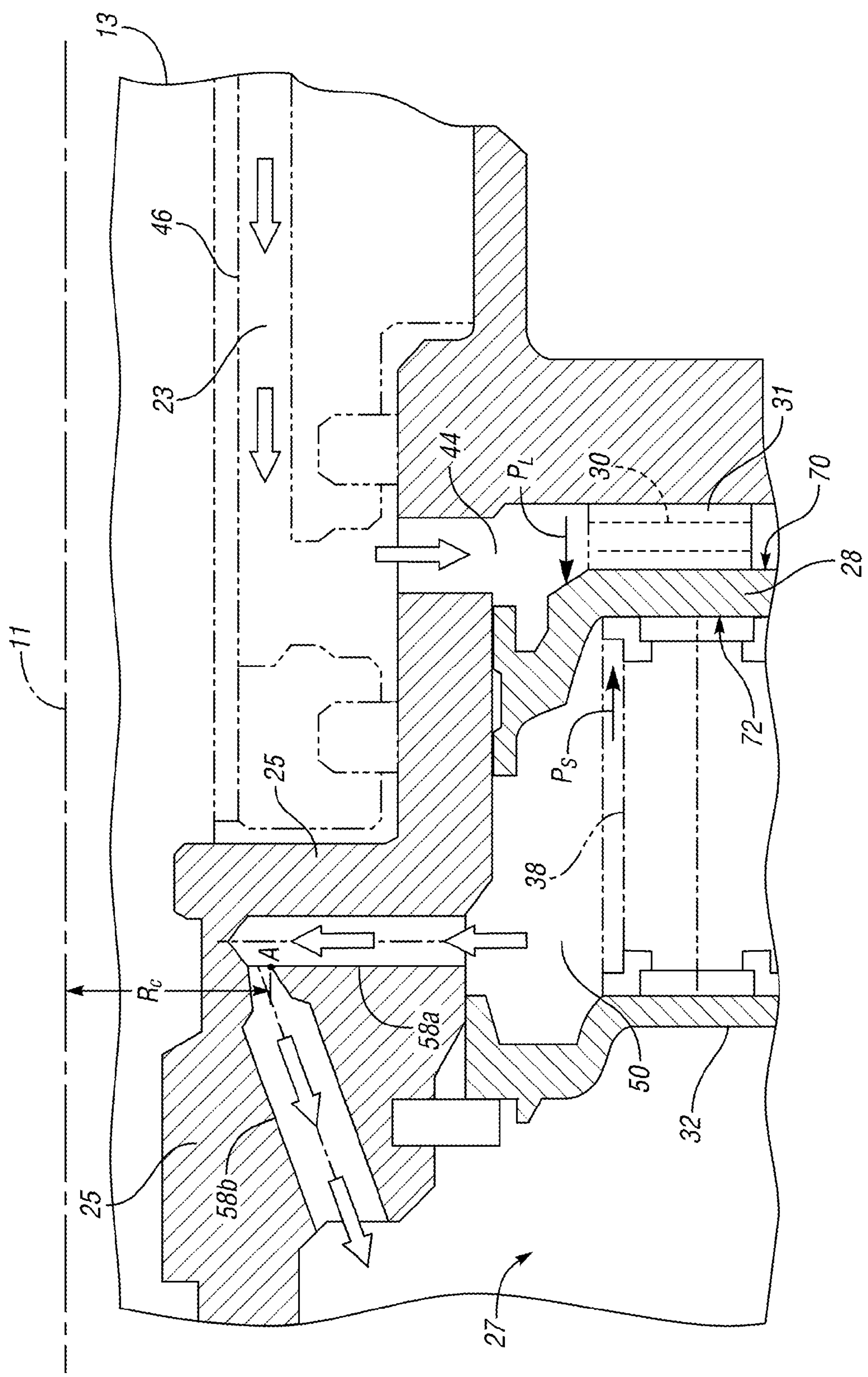
FIG. 2 is an enlarged cross-sectional view of a portion of an improved hydraulic clutch balance cavity shown in FIG. 1.

Because clutch-apply cavity 44 is preferably retained at a substantially full level of fluid 23 due to the low line pressure $P_L$, when clutch assembly 10 is connected to or coupled with a rotating shaft such as shaft 13, the rotation of the clutch assembly 10 likewise rotates the fluid 23 within the clutch-apply cavity 44 to generate a centrifugal force, represented by arrow 70 in FIG. 2, that operates on the clutch-apply piston 28. Absent an opposing centrifugal balance force within balance cavity 50, clutch-apply piston 28 may prematurely actuate and engage the clutch pack 40 if the centrifugal apply force exceeds the return force ($P_S$) provided by return spring 38 (see FIG. 2), To counter this centrifugal apply effect, upon rotation of clutch assembly 10 the balance cavity 50 fills with non-pressurized fluid 22 through fill port 24, and the rotation thereby rotates the fluid 22 within the balance cavity 50 to simultaneously generate an opposing centrifugal balance force within the balance cavity 50. The centrifugal balance force (arrow 72) is ideally equal to the centrifugal apply force (arrow 70). However, because the volume of fluid 22 within balance cavity 50 can be at a low or empty level when clutch assembly 10 is stationary, connection or coupling of clutch assembly 10 to a device capable of rapid acceleration, for example a hybrid transmission motor, requires a rapid influx of fluid 22 to fill balance cavity 50 and provide a sustained centrifugal balance force (arrow 72) capable of opposing the rapidly increasing centrifugal apply force (arrow 70) within the clutch-apply cavity 44. Thus, rapid influx of fluid 22 may thereby help avoid premature clutch engagement and/or clutch wear and burnout.

To optimize the fill rate of balance cavity 50, non-pressurized fluid 22 enters balance cavity 50 upon rotation of the clutch assembly 10 through a dedicated balance cavity feed channel 56 and fluid fill port 24, as shown in FIG. 1. Turning to FIG. 2, as fluid 22 fills the balance cavity 50, air contained therein is displaced or purged through a separate, dedicated air purge channel first portion **58*a*, from which it enters a preferably angled second portion 58*b* which is in fluid communication with secondary cavity 27, and which intersects the first portion 58*a* at point A. After all of the air is purged from balance cavity 50, excess fluid 22 can escape the balance cavity 50 through the air purge channel portions 58*a*, 58*b*. While an angled second portion 58*b* is preferred, those skilled in the art will recognize that other configurations of the air purge channel may be suitable for establishing fluid communication between the balance cavity 50 and the main cavity 27 within the terms of the invention. Using the dedicated air purge channel portions 58*a*, 58*b* as explained hereinabove, air may exhaust from balance cavity 50 in an unimpeded or unrestricted manner, thus facilitating rapid fill of the balance cavity 50 with fluid 22**.

As the clutch assembly 10 rotates, the rotating fluid 23 within the clutch-apply cavity 44 develops a pressure head or centrifugal apply force (arrow 70), as previously discussed herewithin. This centrifugal apply force (arrow 70) operates on the clutch-apply piston 28 along with the low line pressure imparted by pressurized fluid 23, and represented in FIG. 2 as arrow $P_L$. Assuming a negligible centrifugal balance force (arrow 72), only return spring force $P_S$ would oppose clutch-apply piston 28. Thus, if the combined force (arrow 70+$P_L$) were to exceed the return spring force $P_S$, the clutch-apply piston 28 may move toward and prematurely engage or actuate clutch pack 40. Accordingly, air purge channel first portion **58*a* and second portion 58*b* are formed or provided with a control radius $R_C$ measured in a direction radially from the centerline of rotation 11 of shafts 12, 13, as shown in FIG. 2, to intersection point A. In other words, the control radius $R_C$ is the most radially inward extent of only the air purge channel first portion 58*a* with respect to the centerline 11, with fluid 22 entering the first portion 58*a* ultimately spilling over into second portion 58*b* at intersection point A. The control radius $R_C$ is determined by the innermost radius of any rotating fluid 22 confined within balance cavity 50 and first portion 58*a*, with the position of point A being selected based on the amount of centrifugal apply force (arrow 70) to be offset. For example, by moving point A radially inward toward the centerline of rotation 11, the balance force (arrow 72) in the balance cavity 50 increases, and by moving point A radially outward away from the centerline of rotation 11, the balance force decreases. In this manner, the control radius $R_C$ is selected such that, when applied to balance cavity 50 for a given centrifugal apply force (arrow 70), the resulting centrifugal balance force (arrow 72) is substantially equal to the centrifugal apply force (arrow 70), thereby compensating for or offsetting the centrifugal apply effect within the clutch-apply cavity 44**.

Accordingly, a method of compensating for or offsetting this apply effect and reduce clutch wear includes calculating the centrifugal force (arrow 70) within the clutch-apply cavity 44 for a given clutch-apply piston 28. Next, the centrifugal balance force (arrow 72) within an opposing balance cavity 50 is calculated. As previously disclosed hereinabove, the centrifugal apply force (arrow 70) and the centrifugal balance force (arrow 72) are ideally equivalent. Because of the diameter and therefore surface area differences, this is accomplished by designing the balance cavity 50 to achieve a higher pressure over its smaller respective surface area relative to the clutch apply-cavity 44. The pressure head for the balance cavity 50 is designed to provide the appropriate pressure by the placement of control radius $R_C$, i.e. the placement of point A with respect to the centerline of rotation 11. To achieve this force balance within clutch-apply cavity 44 and balance cavity 50 having disparate surface areas, control radius $R_C$ is preferably determined by the innermost radius of any rotating fluid 22 confined within balance cavity 50, as described previously hereinabove. The resulting centrifugal balance force (arrow 72) within balance cavity 50 is substantially equal to the centrifugal apply force (arrow 70) plus the low line pressure ($P_L$) of fluid 23, preferably over the entire operating speed range of rotating shafts 12, 13. The cross sectional diameter of the air purge channel first and second portions 58*a*, 58*b* are preferably cylindrical with a diameter of approximately 2-3 mm, or sufficiently large enough to allow free fluid flow through the air purge channel portions 58*a*, 58*b* and to not unduly restrict movement of the clutch-apply piston 28.

Once air purge channel first portion 58*a* and second portion 58*b* are configured with the control radius $R_C$ as previously described hereinabove to provide the appropriate amount of centrifugal balance force (arrow 72) within balance cavity 50, the balance cavity is filled with non-pressurized fluid 22 from, for example, an oil reservoir or other channel of non-pressurized oil within the transmission. The fluid 22 enters the balance cavity 50 through fill port 24 as described previously hereinabove, and as shown in FIG. 1, and air trapped or contained within the balance cavity 50 is rapidly purged or vented through a dedicated air purge channel portions 58*a*, 58*b* as shown in detail in FIG. 2, without interfering with, blocking, or otherwise restricting the fill of fluid 22 within balance cavity 50. After air is purged, excess fluid 22 within balance cavity 50 may then escape through air purge channel portions 58*a*, 58*b*.

While the best modes for carrying out the invention have been described in detail, those familiar with the art to which this invention relates will recognize various alternative designs and embodiments for practicing the invention within the scope of the appended claims.

The invention claimed is:

1. A rotatable clutch assembly having a centerline of rotation, and comprising:

a housing at least partially defining a primary housing cavity and a secondary housing cavity, said primary housing cavity including a clutch-apply cavity and a balance cavity each being rotatable around the centerline to provide a clutch-apply force and a centrifugal balance force, respectively, wherein said balance cavity is in fluid communication with a pair of fluid channels including a dedicated air purge channel and a liquid fill channel positioned on opposite sides of a plane containing the centerline with respect to each other;

wherein said air purge channel has a first portion extending radially with respect to the centerline for directing air from said balance cavity toward the centerline, and a second portion that intersects said first portion at an intersection point, said secondary housing cavity being in direct fluid communication with said second portion of said air purge channel, wherein said air purge channel is configured to sufficiently rapidly purge said air from said balance cavity to said secondary cavity so that fluid may more rapidly fill said balance cavity through said liquid fill channel.

2. The rotatable clutch assembly of claim 1, wherein said liquid fill channel is in fluid communication with a supply of non-pressurized clutch fluid, and wherein the rotatable clutch assembly is operatively attached to a drive shaft.

3. The rotatable clutch assembly of claim 2, wherein said drive shaft is adapted to be operatively attached to an electric motor.

4. The rotatable clutch assembly of claim 1 including a return spring, a balance piston, and a clutch-apply piston, wherein said return spring is disposed between said balance piston and said clutch-apply piston within said balance cavity to provide a biasing return spring force to said clutch-apply piston.

5. The rotatable clutch assembly of claim 1, wherein a sufficient control radius is provided between said intersection point and the centerline, said control radius being measured radially from the centerline to said intersection point, such that said centrifugal balance force substantially offsets said centrifugal apply force.

6. A vehicle transmission comprising:

a housing at least partially defining a primary housing cavity and a secondary housing cavity, said primary housing cavity including a clutch-apply cavity and a balance cavity;

a rotatable hydraulic clutch disposed within said housing and having a fluid suitable for lubricating and cooling of said clutch, said clutch having a centerline of rotation;

a balance piston;

a clutch-apply piston, wherein said balance piston and said clutch-apply piston at least partially define said balance cavity, and wherein said clutch-apply piston and said clutch housing at least partially define said clutch-apply cavity opposite said balance cavity; and a pair of fluid channels each defined by said housing, and each being in fluid communication with said balance cavity, said pair of fluid channels including:

a dedicated air purge channel having a first portion extending radially from said centerline for directing air from said balance cavity toward the centerline, and an angled second portion that intersects said first portion at an intersection point and that extends from said intersection point to said secondary housing cavity; and a liquid fill channel positioned on opposite sides of a plane containing the centerline with respect to said air purge channel;

wherein said air purge channel is configured to sufficiently rapidly purge air from said balance cavity to said secondary housing cavity so that said fluid may more rapidly enter said balance cavity through said liquid fill channel.

7. The vehicle transmission of claim 6, wherein said liquid fill channel is in fluid flow communication with a supply of clutch fluid, and wherein said rotatable clutch is operatively attachable to a drive shaft.

8. The vehicle transmission of claim 7, wherein said drive shaft is operatively attachable to an electric motor.

9. The vehicle transmission of claim 7 including a return spring, a balance piston, and a clutch-apply piston, wherein said return spring is disposed between said balance piston and said clutch-apply piston within said balance cavity to provide a biasing return spring force to said clutch-apply piston.

10. The vehicle transmission of claim 6, wherein a sufficient control radius is provided between said intersection point and said centerline, said control radius being measured radially from said centerline to said intersection point, such that said centrifugal balance force substantially offsets said centrifugal apply force.

11. A method for reducing clutch wear in a clutch assembly having a housing defining a primary housing cavity that includes a rotatable clutch-apply cavity and a rotatable balance cavity, the housing also defining a secondary housing cavity positioned opposite the primary housing cavity, the balance cavity containing rotating fluid when the clutch assembly is rotating about a centerline of rotation, each of the balance cavity and the clutch-apply cavity being adapted to receive fluids via a liquid fill channel defined by the housing, the method comprising:

calculating a centrifugal apply force within the clutch-apply cavity;

calculating a centrifugal balance force within the balance cavity;

configuring the balance cavity with a dedicated air purge channel defined by the housing and adapted for exhausting air from the balance cavity;

determining an innermost radius of a predetermined portion of said rotating fluid with respect to the centerline, said predetermined portion being a portion of the rotating fluid that is confined within the balance cavity; and providing said air purge channel on opposite sides of a plane containing the centerline with respect to the liquid fill channel, with said first portion extending radially from said centerline for directing air from said balance cavity toward the centerline, and with a second portion that intersects said first portion at an intersection point and extends from said intersection point to the secondary housing cavity;

wherein providing said air purge channel with said first portion includes providing a control radius as measured in a direction radially from said centerline of rotation to said intersection point, such that said centrifugal balance force substantially offsets said centrifugal apply force, and wherein said control radius is determined by the innermost radius of said predetermined portion of said rotating fluid with respect to the centerline, said control radius being suitable for offsetting any excess of said centrifugal balance force over said centrifugal apply force.

12. The method of claim 11, including connecting said clutch assembly to a drive shaft which is operatively attachable to an electric motor.

* * * * *